United States Patent
Fey

(10) Patent No.: US 12,296,534 B2
(45) Date of Patent: May 13, 2025

(54) ADDITIVE MANUFACTURING METHOD AND SYSTEM

(71) Applicant: AMCM GMBH, Starnberg (DE)

(72) Inventor: Georg Fey, Munich (DE)

(73) Assignee: AMCM GMBH, Starnberg (DE)

( * ) Notice: Subject to any disclaimer, the term of this patent is extended or adjusted under 35 U.S.C. 154(b) by 604 days.

(21) Appl. No.: 17/309,302

(22) PCT Filed: Nov. 7, 2019

(86) PCT No.: PCT/EP2019/080610
§ 371 (c)(1),
(2) Date: May 17, 2021

(87) PCT Pub. No.: WO2020/104212
PCT Pub. Date: May 28, 2020

(65) Prior Publication Data
US 2022/0001614 A1    Jan. 6, 2022

(30) Foreign Application Priority Data
Nov. 19, 2018 (DE) ............... 10 2018 129 028.4

(51) Int. Cl.
*B29C 64/282* (2017.01)
*B29C 64/153* (2017.01)
(Continued)

(52) U.S. Cl.
CPC .......... *B29C 64/282* (2017.08); *B29C 64/153* (2017.08); *B29C 64/176* (2017.08);
(Continued)

(58) Field of Classification Search
CPC ... B29C 64/282; B29C 64/176; B29C 64/153; B29C 64/393; B33Y 10/00; B33Y 30/00; B33Y 50/02
See application file for complete search history.

(56) References Cited

U.S. PATENT DOCUMENTS 8,172,562 B2    5/2012  Mattes
9,358,729 B2    6/2016  Hofacker et al.
(Continued)

FOREIGN PATENT DOCUMENTS

CN    1678448 A    10/2005
CN    105479743 A    4/2016
(Continued)

OTHER PUBLICATIONS

"U.S. Appl. No. 17/309,303 Preliminary Amendment filed May 17, 2021", 8 pgs.
(Continued)

*Primary Examiner* — Seyed Masoud Malekzadeh
(74) *Attorney, Agent, or Firm* — Polsinelli PC

(57) ABSTRACT

The invention relates to a method for the additive manufacturing of at least one three-dimensional object (1) by means of a system comprising a coating unit (40) and at least two irradiation units (50), the irradiation areas of which partially overlap or are adjacent to each other, wherein the irradiation areas are adapted so that a total irradiation period for selectively solidifying one or more layers of applied build-up material (30) is minimised as required. The invention further relates to a system for additive manufacturing of three-dimensional objects and a computer-readable storage medium.

5 Claims, 3 Drawing Sheets

(51) Int. Cl.
*B29C 64/176* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 9,573,225 B2* | 2/2017 | Buller | B28B 1/001 |
| 9,662,840 B1* | 5/2017 | Buller | B22F 10/38 |
| 9,694,541 B2* | 7/2017 | Pruett | B29C 64/176 |
| 9,919,360 B2* | 3/2018 | Buller | B22F 12/49 |
| 9,962,767 B2* | 5/2018 | Buller | B23K 26/144 |
| 10,058,920 B2* | 8/2018 | Buller | B23K 26/144 |
| 10,071,422 B2* | 9/2018 | Buller | B33Y 40/00 |
| 10,144,176 B1* | 12/2018 | Buller | B33Y 70/00 |
| 10,183,330 B2* | 1/2019 | Buller | B23K 26/0869 |
| 10,207,454 B2* | 2/2019 | Buller | B23K 26/342 |
| 10,252,336 B2* | 4/2019 | Buller | B29C 64/364 |
| 10,272,525 B1* | 4/2019 | Buller | B23K 26/0006 |
| 10,286,603 B2* | 5/2019 | Buller | B29C 64/393 |
| 10,315,252 B2* | 6/2019 | Symeonidis | B23K 15/0086 |
| 10,449,696 B2* | 10/2019 | Elgar | B29C 64/153 |
| 10,611,092 B2* | 4/2020 | Buller | B29C 64/35 |
| 10,688,722 B2* | 6/2020 | Buller | B33Y 40/00 |
| 10,722,944 B2* | 7/2020 | Wienberg | B23K 26/702 |
| 10,786,865 B2* | 9/2020 | Hellestam | B23K 15/02 |
| 10,946,446 B2* | 3/2021 | Domrose | B22F 12/84 |
| 11,247,390 B2* | 2/2022 | Krol | B22F 10/322 |
| 11,517,964 B2* | 12/2022 | Ljungblad | B33Y 50/02 |
| 11,613,073 B2* | 3/2023 | Barnes | B29C 64/295 264/405 |
| 11,623,282 B2* | 4/2023 | Nordkvist | B29C 64/153 |
| 11,848,534 B2* | 12/2023 | Batchelder | B29C 64/386 |
| 2006/0108712 A1* | 5/2006 | Mattes | B33Y 10/00 425/375 |
| 2012/0211155 A1* | 8/2012 | Wehning | A61C 13/0018 156/380.9 |
| 2013/0193620 A1* | 8/2013 | Mironets | B22F 10/28 264/401 |
| 2015/0367415 A1 | 12/2015 | Buller et al. | |
| 2016/0167160 A1* | 6/2016 | Hellestam | B23K 15/0086 219/76.12 |
| 2016/0167303 A1 | 6/2016 | Petelet | |
| 2016/0368050 A1 | 12/2016 | Morris et al. | |
| 2017/0072636 A1 | 3/2017 | Ng et al. | |
| 2017/0165751 A1* | 6/2017 | Buller | B23K 26/702 |
| 2017/0165752 A1* | 6/2017 | Buller | B29C 64/393 |
| 2017/0165753 A1* | 6/2017 | Buller | B29C 64/357 |
| 2017/0165754 A1* | 6/2017 | Buller | B33Y 30/00 |
| 2017/0165792 A1* | 6/2017 | Buller | B29C 64/214 |
| 2017/0259505 A1* | 9/2017 | Pruett | B29C 64/153 |
| 2017/0305140 A1 | 10/2017 | Wüst | |
| 2017/0348905 A1* | 12/2017 | Fey | B33Y 10/00 |
| 2018/0161875 A1* | 6/2018 | Buller | G05B 19/4099 |
| 2018/0281113 A1 | 10/2018 | Carter et al. | |
| 2018/0281282 A1* | 10/2018 | Elgar | B29C 64/25 |
| 2018/0281283 A1* | 10/2018 | Frechman | B22F 10/73 |
| 2018/0281284 A1* | 10/2018 | Elgar | B29C 64/357 |
| 2018/0311734 A1 | 11/2018 | Herzog et al. | |
| 2018/0318928 A1* | 11/2018 | Christiansen | B23K 26/144 |
| 2018/0326488 A1* | 11/2018 | Lappas | B23K 26/144 |
| 2019/0118263 A1* | 4/2019 | Buller | B29C 64/171 |
| 2019/0168304 A1 | 6/2019 | Krol et al. | |
| 2019/0232564 A1* | 8/2019 | Pontiller-Schymura | B33Y 30/00 |
| 2019/0315064 A1* | 10/2019 | Budge | B22F 10/28 |
| 2019/0344500 A1 | 11/2019 | Côté | |
| 2020/0094320 A1 | 3/2020 | Krol et al. | |
| 2022/0016839 A1* | 1/2022 | Fey | B29C 64/386 |
| 2022/0032552 A1* | 2/2022 | Fey | B33Y 50/02 |
| 2023/0122002 A1* | 4/2023 | Buller | B29C 64/35 425/174.4 |
| 2023/0364861 A1* | 11/2023 | Buller | B23K 26/04 |

FOREIGN PATENT DOCUMENTS

| | | |
|---|---|---|
| CN | 106363768 A | 2/2017 |
| CN | 106608044 A | 5/2017 |
| CN | 107457988 A | 12/2017 |
| CN | 107980022 A | 5/2018 |
| DE | 10235434 A1 | 2/2004 |
| DE | 102009046440 A1 | 5/2011 |
| DE | 102010041284 A1 | 3/2012 |
| EP | 3233336 A1 | 10/2017 |
| EP | 3281727 A1 | 2/2018 |
| EP | 3360659 A1 | 8/2018 |
| WO | WO-2008074287 A1 | 6/2008 |
| WO | WO-2014199150 A1 | 12/2014 |
| WO | WO-2017100816 A1 | 6/2017 |
| WO | WO-2020/104205 A1 | 5/2020 |

OTHER PUBLICATIONS

"U.S. Appl. No. 17/309,334 Preliminary Amendment filed May 19, 2021", 10 pgs.
"German Application Serial No. 102018129024.1, Search Report dated Jul. 12, 2019", (w/ Concise Statement of Relevance), 9 pgs.
"International Application Serial No. PCT/EP2019/080568, International Preliminary Report on Patentability mailed Jun. 3, 2021", 9 pgs.
"International Application Serial No. PCT/EP2019/080597, International Preliminary Report on Patentability mailed Jun. 3, 2021", 9 pgs.
"International Application Serial No. PCT/EP2019/080597, International Search Report mailed Feb. 17, 2020", (w/ English Translation), 6 pgs.
"International Application Serial No. PCT/EP2019/080597, Written Opinion mailed Feb. 17, 2020", (w/ English Translation), 14 pgs.
"International Application Serial No. PCT/EP2019/080610, International Preliminary Report on Patentability mailed Jun. 3, 2021", 9 pgs.
"International Application Serial No. PCT/EP2019/080568, International Search Report and Written Opinion mailed Feb. 17, 2020", (w/ English Translation), 19 pgs.
"International Application Serial No. PCT/EP2019/080610, International Search Report mailed Feb. 17, 2020", w/ English Translation, (Feb. 17, 2020), 6 pgs.
"International Application Serial No. PCT/EP2019/080610, Written Opinion mailed Feb. 17, 2020", (Feb. 17, 2020), 6 pgs.
"Chinese Application No. 201980086717.3, Notification of the First Office Action mailed Jan. 4, 2023", (Jan. 4, 2023), 17 pgs.
"Chinese Application No. 201980087068.9, Chinese Search Report dated Dec. 14, 2022", (Dec. 14, 2022), 3 pgs.
"Chinese Application No. 201980087068.9, Office Action dated Dec. 21, 2022", (Dec. 21, 2022), 14 pgs.
"Chinese Application No. 201980085828.2, Notification of the First Office Action mailed Dec. 2, 2022", (Dec. 2, 2022), 18 pgs.
"U.S. Appl. No. 17/309,303, Non Final Office Action mailed Aug. 30, 23", 22 pgs.
"U.S. Appl. No. 17/309,303, Response filed Aug. 22, 2023 to Restriction Requirement mailed Jun. 27, 2023", 9 pgs.
"U.S. Appl. No. 17/309,303, Restriction Requirement mailed Jun. 27, 2023", 7 pgs.
"U.S. Appl. No. 17/309,334, Non Final Office Action mailed Aug. 2, 2203", 11 pgs.
"U.S. Appl. No. 17/309,334, Response filed Jul. 14, 2023 to Restriction Requirement mailed May 17, 2023", 7 pgs.
"U.S. Appl. No. 17/309,334, Restriction Requirement mailed May 17, 2023", 8 pgs.
"U.S. Appl. No. 17/309,334, Response filed Nov. 2, 2023 to Non Final Office Action mailed Aug. 2, 2023", 11 pgs.

(56) References Cited

OTHER PUBLICATIONS

"U.S. Appl. No. 17/309,334, Final Office Action mailed Nov. 29, 2023", 14 pgs.
"U.S. Appl. No. 17/309,303, Response filed Dec. 28, 2023 to Non Final Office Action mailed Aug. 30, 2023", 17 pgs.
"U.S. Appl. No. 17/309,334, Response filed Jan. 29, 2024 to Final Office Action mailed Nov. 29, 2023", 11 pgs.
"U.S. Appl. No. 17/309,334, Advisory Action mailed Feb. 8, 2024", 3 pgs.
"U.S. Appl. No. 17/309,303, Final Office Action mailed May 9, 2024", 24 pgs.
"U.S. Appl. No. 17/309,334, Final Office Action mailed Jun. 7, 2024", 18 pgs.

* cited by examiner

ADDITIVE MANUFACTURING METHOD AND SYSTEM

PRIORITY APPLICATIONS

This application is a U.S. National Stage Filing under 35 U.S.C. § 371 from International Application No. PCT/EP2019/080610, filed on Nov. 7, 2019, and published as WO2020/104212 on May 28, 2020, which claims the benefit of priority to German Application No. 10 2018 129 028.4, filed on Nov. 19, 2018; the benefit of priority of each of which is hereby claimed herein, and which applications and publication are hereby incorporated herein by reference in their entirety.

TECHNICAL FIELD OF THE INVENTION

The invention relates to a method for additive manufacturing of three-dimensional objects and a system for additive manufacturing of three-dimensional objects. Furthermore, the present invention relates to a computer-readable storage medium.

BACKGROUND

Conventional methods for additive manufacturing of three-dimensional objects apply a strictly serial sequence of applying a new layer of build-up material and irradiating it to solidify the applied layer. The irradiation to solidify the applied layer of build-up material always takes place along constant irradiation areas. Such a serial procedure results in very long non-productive times, which reduce the efficiency of the system as a whole. The production of even a single three-dimensional object by means of an additive manufacturing process is correspondingly cost-intensive and time-consuming.

Furthermore, known systems for the additive manufacturing of three-dimensional objects require additional space in order to accommodate or stow away the coating unit during the irradiation for the selective solidification of the last applied build-up material outside the area to be selectively solidified, i.e. outside the installation space.

For example, DE 10 2010 041 284 A1 describes a process and a system for selective laser sintering, wherein the workpiece to be produced in layers has at least partially a curved contour and is produced by means of several line-like energy inputs by laser beams. In accordance with a fixed sequence of the line-like energy inputs, sections of the contour which are spaced apart from one another are processed in order to avoid overheating of the workpiece.

SUMMARY

The invention is based on the object of providing a method for additive manufacturing which enables the efficient production or generation of at least one three-dimensional object with consistent quality in a simple and cost-effective manner. Furthermore, it is an object of the invention to provide a system and a computer-readable storage medium.

According to the invention, this object is solved with respect to the disclosed method, with respect to the disclosed system, and with respect to the disclosed computer-readable storage medium. Preferred embodiments are further discussed herein.

Specifically, the task is solved by a method for the additive manufacturing of three-dimensional objects by means of a system which has a building space, a building platform within the building space, on which the at least one object to be manufactured can be built up layer by layer, at least one coating unit for the layer-by-layer application of the build-up material in a building plane which is provided parallel to the building platform, and at least two irradiation units for the locally selective solidification of the build-up material in the building plane, the method having the following steps:

- subdividing the building space into at least a first and a second segment along the direction of extension of the building platform whereby at least one of the segments is formed as a single segment or at least one of the segments is subdivided into at least two sub-segments;
- assigning each one of the irradiation units to one of the segments and/or the sub-segments of a segment, wherein irradiation areas of the irradiation units, in particular irradiation units arranged next to one another, partially overlap or the irradiation areas are adjacent to one another;
- adapting the irradiation areas along the building plane by adapting the position and/or the orientation of at least one of the irradiation units, so that a total irradiation time for selectively solidifying one layer or more layers of the applied build-up material along all segments and/or all sub-segments in the building plane is minimised as required;
- applying and selectively solidifying a layer of the build-up material along the segments and/or the sub-segments.

The invention is based on the underlying idea of providing a method that uses the irradiation units in such a way that optimum utilisation is achieved by minimising non-productive time. In particular, the process time for manufacturing one or more three-dimensional objects can be optimised or reduced.

For this purpose, it is provided that the irradiation areas of the irradiation units can be adapted as desired and can be aligned overlapping or adjacent to one another in such a way that the total irradiation time of one layer or several layers of the applied build-up material can be reduced in an effective manner. In particular, the irradiation times of the individual segments and/or sub-segments for selective solidification of a layer of build-up material can be designed to be substantially equally distributed in order to achieve a reduction of the total irradiation time. Accordingly, the adaptation of the irradiation areas can be provided in particular taking into account the structure to be built up layer by layer of the at least one three-dimensional object to be produced.

In the sense of an additive manufacturing process, it is possible to build up or create a three-dimensional object or several three-dimensional objects layer by layer. Thus it is intended that the geometry of the at least one three-dimensional object is generated by depositing layers of the build-up material step by step on top of each other and solidifying them, in particular by selectively solidifying them locally.

For the purposes of the present invention, the term selective solidification means that a layer of newly applied build-up material is suitably solidified along the desired contour or contours of the at least one three-dimensional object to be produced. For this purpose, the applied layer of build-up material is specifically irradiated by the irradiation units along the geometry of the three-dimensional object to be produced. A layer of build-up material is selectively solidified in the sense of the present invention as soon as a sufficient, appropriate solidification of the layer of build-up material has taken place or has been achieved. A selectively solidified layer of build-up material thus represents a part of the end product to be produced and preferably the basis for depositing and selectively solidifying a further layer of build-up material.

According to the invention, the building space, i.e. the volume of a system for carrying out the method in the direction of extension or along the building platform, in which the at least one or more three-dimensional objects can be built up layer-by-layer, is divided into at least a first and a second segment. The layers of build-up material to be applied or deposited are to be assigned in sections to the first or second segment. The building plane set in each case can be subdivided on the basis of the segments.

Preferably, the building platform is provided as a circular or ring-shaped, oval-shaped, U-shaped, rectangular frame-shaped or similar building platform, so that one or more three-dimensional objects can be produced and arranged over an angular range of 360 degrees along a circumferentially or circularly closed building platform. In this respect, a revolution of the coating unit can be understood to mean that the coating unit is moved over at least 360 degrees along the extension of the building platform. The extension of the building platform is thus to be understood in particular as the formation of the building platform in the circumferential direction along the angular range of 360 degrees.

Furthermore, the segments can be provided as individual segments or each have sub-segments. In this way, a segment can be subdivided or subdividable into sub-segments.

One of the at least two irradiation units is assigned to each of the segments. Irradiation of sub-segments of a segment by one of the irradiation units for selective solidification can be carried out serially, i.e. one after the other.

Alternatively, sub-segments can be alternately selectively solidified by means of the associated irradiation unit of the segment in such a way that for example the coating unit can move through the sub-segments and the irradiation unit switches to selective solidification of the other sub-segment before the expiry of the irradiation time as required in one of the sub-segments.

Consequently, an irradiation unit can switch during selective solidification between two sub-segments as required, in particular before the required irradiation duration of one of the sub-segments has expired. If a change between the sub-segments is made by the assigned irradiation unit and the required irradiation duration has not been completely reached in one sub-segment, the selective solidification of this sub-segment is to be continued at a later time in order to achieve selective solidification.

The advantage is that by the sub-segments it becomes possible, for example, to allow the coating unit to pass through a segment, while the selective solidification can be continued alternately in one of the sub-segments at a time.

Deactivation of an irradiation unit is to be understood for the purpose of the present invention as a switching off of the irradiation unit or as a switching of the irradiation unit between sub-segments for selective solidification, whereby the irradiation unit is switched from one sub-segment to the other sub-segment. In such a changeover of the irradiation unit from one sub-segment to another sub-segment, a complete switching off of the irradiation unit in the sense of the present invention is not necessarily required, so that the irradiation unit selectively solidifies build-up material along the sub-segments without interruption.

Furthermore, during the manufacturing process of at least one three-dimensional object, the coating unit may be continuously movable, in particular at a constant speed, or discontinuously movable in the direction of extension of the building platform or building plane. In this sense, the coating unit can be moved continuously and preferably without interruption, regardless of whether a new layer of build-up material is applied along the set building plane. Preferably, the speed at which the coating unit is moved is set in such a way that an advantageous minimisation of non-productive times during the production or manufacture of the at least one three-dimensional object is achievable.

In particular, the coating unit is moved at least at a minimum speed, wherein the minimum speed for moving the coating unit corresponds to a minimum speed for depositing or applying a layer of build-up material.

Preferably, the coating unit may be advanced at a maximum speed, wherein the maximum speed for advancing the coating unit corresponds to a maximum speed for depositing or applying a layer of build-up material. In this way, the time required for a revolution of the coating unit, along the extension of the building platform or the building plane, can be minimised.

An idle run of the coating unit with at least the minimum speed to be maintained is performed if a revolution time of the coating unit for applying the at least one layer of build-up material would end before the irradiation time as required in at least one of the segments along the set building plane has not yet been reached or expired. Accordingly, an idle run is performed if the coating unit would enter a segment that is not yet fully selectively solidified when applying a new layer of build-up material.

Alternatively, the coating unit may after applying a complete layer of build-up material in a segment and/or sub-segment as a parking segment which is already selectively solidified, be stopped and temporarily parked, in particular until a new layer of build-up material can be applied along the segments or sub-segments.

In this sense, the application of a layer of build-up material is only carried out in one continuous, complete revolution along the building plane. If this is not possible due to segments or sub-segments that have not yet been selectively solidified, an idle run by the coating unit is carried out or the coating unit is stopped in a predeterminable parking segment.

According to the invention, the selective solidification of the build-up material in a segment takes place when at least one layer of build-up material is deposited along the entire segment or an entire sub-segment by activating the respective associated irradiation unit.

If a segment or sub-segment is only partially coated with build-up material, there is preferably no selective solidification until the coating unit has deposited a complete layer of build-up material. The activation of the respectively assigned irradiation unit can only take place if the coating unit is not located in the respective segment or sub-segment which is to be selectively solidified. Furthermore, the respective irradiation unit for a segment or sub-segment of a segment is only activated if the last applied layer of build-up material is not already selectively solidified.

Accordingly, deactivation of the irradiation unit in the sense of the present invention can take place when a segment or the associated sub-segments is/are selectively solidified or when the coating unit enters the segment and/or sub-segment to be selectively solidified.

Further, in terms of the present invention, it is envisaged that the application of build-up material by the coating unit is deactivated after the application of at least one layer of build-up material, whereby the coating unit can continue to move through any number of segments and/or sub-segments without applying or depositing a new layer of build-up material until the coating unit reaches a parking segment or such that the coating unit at least performs an idle run.

In particular, the application of build-up material by means of the coating unit can be deactivated as soon as at least one complete layer of build-up material has been deposited in all segments and/or sub-segments.

A complete layer is understood to mean that build-up material is deposited over the entire extension of a segment or sub-segment. In this sense, the coating unit makes at least one complete revolution along the building platform in order to deposit a layer of build-up material. If a segment or sub-segment has only been partially recoated, the subsequent depositing of a further layer over the complete extension of the segment or sub-segment is provided for the provision of a complete layer of build-up material, in particular following the other segments in the course of the last completed revolution of the coating unit.

In particular, the coating unit may be moved in the direction of extension of the building platform during the entire duration of the process or intermittently, dispensing a new layer of build-up material as required. In this sense, the coating unit can perform uninterrupted revolutions along the extension of the building platform.

After deactivation of the dispensing of build-up material, the further movement of the coating unit along the extension of the building platform can be understood as an idle run. An idle run may comprise one or more segments or sub-segments or one or more revolutions or sub-revolutions of the coating unit. During such an idle run, no new layer of build-up material is dispensed, whereby the irradiation units of the segments are deactivated in each case as soon as the coating unit enters the respective segment or an associated sub-segment.

After the application of at least one layer of build-up material, the coating unit can perform any number of revolutions or partial revolutions in order to perform idle runs or can be stopped in a predeterminable parking segment until a new layer of build-up material is or can be expediently applied.

According to the invention, it is provided that the irradiation units, which are each associated with a segment and/or the sub-segments of a segment, have irradiation areas. For the purposes of the present invention, the irradiation area of an irradiation unit is to be understood as that area along the set building plane which can be selectively solidified by means of the respective irradiation unit. Thus, the irradiation area of an irradiation unit can cover the respective assigned segment and/or extend beyond the assigned segment into an adjacent segment.

Furthermore, it is provided that the irradiation area of at least one of the irradiation units can be adapted as required. Preferably, the irradiation area of at least one irradiation unit can be adapted or readjusted after a plurality of layers of the build-up material, so that a total irradiation time for selective solidification of the individual layers of build-up material can be minimised. Alternatively, individual irradiation areas can be adapted as required after individual applied and selectively solidified layers of build-up material.

An adaptation of an irradiation area can be performed by adjusting the position of the respective irradiation unit and/or by changing the orientation of the respective irradiation unit. In the sense of the present invention, changing the position of an irradiation unit describes in particular its arrangement along the extension direction of the building platform and thus a longitudinally displaceable position. The orientation of an irradiation unit describes in particular the angular orientation or inclination of the irradiation unit and/or of a beam path of the irradiation unit, for example with respect to the horizontal. According to the invention, an irradiation area can thus be created by a longitudinal displacement of an irradiation unit in the extension direction of the building platform and/or by changing the angular orientation of the irradiation unit and/or the beam path of the irradiation unit.

By means of the continuously movable coating unit, including the execution of idle runs or the stopping in a parking segment, and the selectively tuned and adaptable irradiation for the selective solidification of at least one applied layer of build-up material, an efficient and time-saving process for the additive manufacturing of at least one three-dimensional object can be provided, in particular if the irradiation units can be adapted as required to optimise or minimise the total irradiation times.

According to a further embodiment, a change in the relative position between the building platform and the coating unit for providing a modified building plane is performed continuously or discontinuously.

For the purposes of the present invention, the speed of the coating unit or coating unit speed describes in particular the speed at which the coating unit moves along the extension of the building platform, in particular in the horizontal direction. The speed of the relative movement between the building platform and the coating unit describes the speed in the course of the change in the relative position between the building platform and the coating unit, in particular in the vertical direction.

The movement of the coating unit in the direction of extension of the building platform can be continuous or discontinuous. Furthermore, the relative movement, preferably at least substantially in the vertical direction, between the coating unit and the building platform can also be continuous.

Thus, a continuous, i.e. uninterrupted, readjustment of the building plane can be effected by means of the relative movement between the building platform and the coating unit for changing the relative position. For example, the relative movement or readjustment of the building plane can be continued during the application of a layer of build-up material as well as during an idle run of the coating unit or during the parking of the coating unit in a segment.

Alternatively, a discontinuous change of the relative position between the building platform and the coating unit, i.e. stepwise readjustment of the building plane, is possible. Furthermore, it is also possible in the sense of the present invention that the coating unit is temporarily stopped for changing the relative position between the building platform and the coating unit, in particular during an idle run or within a parking segment. Continuous or discontinuous movement of the coating unit is possible.

According to one embodiment, a check and adaptation as required, of the position and/or the orientation of at least one of the irradiation units is performed after each selectively solidified layer of build-up material or after any number of selectively solidified layers of build-up material, for minimising, as required, the total irradiation time of one layer or several layers of build-up material.

In particular, the irradiation times of the individual segments can be advantageously matched to each other or distributed among the various irradiation units by selective distribution of the irradiation areas of the irradiation units, so that the selective solidification of the segments or sub-segments preferably takes as comparable a time as possible.

In this way, the total irradiation time of individual or several layers of build-up material can be optimised.

Preferably, the irradiation areas of individual irradiation units can be adapted in such a way that an optimised, average total irradiation time is achieved over a plurality of layers of the build-up material. The position and/or orientation of the irradiation units necessary for this can deviate from a position and/or orientation with which a minimum total irradiation time of the respective individual layers of build-up material would be achievable.

Thus, the irradiation areas of the irradiation units can be set averaged for, for example, five successive layers of build-up material in order to minimise the process time for producing at least one three-dimensional object.

In one embodiment, segments along partially overlapping irradiation areas of the at least two irradiation units are selectively solidified by one or both irradiation units to minimise the total irradiation time of one layer or several layers of build-up material as required.

Along overlapping irradiation areas of two irradiation units, selective solidification can be performed by one of the two irradiation units. In particular, the two irradiation units can each partially selectively solidify the layer of build-up material along the overlapping irradiation areas. In this way, especially structures that are complicated and complex to selectively solidify can be selectively solidified in an advantageous and time-efficient manner by means of two irradiation units using their overlapping irradiation areas.

Alternatively, the irradiation areas of two irradiation units can be adjacent to each other, in particular along the boundary between their respective assigned segments or subsegments.

All irradiation units are adaptable with respect to their respective irradiation areas in such a way that optimisation of the total irradiation time for selective solidification of the individual layers of build-up material is possible as required.

According to a further embodiment, the position and/or orientation of the irradiation units is adapted automatically and/or manually.

In this way, an adaptation of the irradiation units or the irradiation areas can be carried out by a user. Alternatively, a preferably fully automatic optimisation of the manufacturing process by adapting the irradiation areas as required is conceivable. Thus, a time-efficient manufacturing process for at least one three-dimensional object to be manufactured can be provided.

In an ancillary aspect of the invention, a system is provided which is suitable for additive manufacturing of three-dimensional objects by layer-by-layer deposition of a build-up material and locally selective solidification of the build-up material according to the method of the present invention.

The system according to the invention is formed with the building space, the building platform within the building space, on which the at least one object to be produced can be built up layer by layer, the at least one coating unit for layer-by-layer application of the build-up material in a building plane which is provided parallel to the building platform, and at least two irradiation units for locally selective solidification of the build-up material in the building plane. The building space is subdivided in the direction of extension of the building platform into at least a first segment and a second segment and at least one of the segments is formed as a single segment or at least one of the segments is subdivided into at least two sub-segments, wherein with each segment or the sub-segments of a segment at least one of the irradiation units is associated and irradiation areas of the irradiation units, in particular irradiation units arranged next to one another, partially overlap or the irradiation areas adjoin one another. The irradiation areas along the building plane can be adapted by adapting the position and/or the orientation of at least one of the irradiation units in such a way that a total irradiation time can be minimised for the selective solidification of one layer or several layers of the applied build-up material along all segments in the building plane.

The at least one coating unit serves to apply the build-up material layer by layer in a building plane which is provided parallel to the building platform. The building platform thus represents the base plane of the system on which the at least one three-dimensional object is producible. When depositing the first layer of build-up material for an object to be manufactured, the building plane is thus preferably arranged on the building platform.

Alternatively, the first building plane for applying the first layer of build-up material can be provided vertically offset relative to the building platform in such a way that a powder bed or not selectively solidified material bed remains below the finally selectively solidified layer of build-up material. Thus, a detachment of the finished three-dimensional object from the building platform can be facilitated.

The coating unit can be arranged inclined with respect to the vertical or horizontal in such a way that an expedient application of build-up material along the intended, adjusted building plane is possible. In particular, the coating unit can be arranged inclined in such a way that gravity effects can be compensated for when depositing or applying the build-up material.

For the purpose of the present invention, the building plane describes in particular the current working plane in which a new, further layer of build-up material is to be applied or selectively solidified. The readjustment of the building plane or a readjusted building plane thus describes the change of the building plane in order to be able to apply and selectively solidify a new, next layer of build-up material, in the sense of a layer-by-layer manufacture or creation of at least one three-dimensional object.

Such a readjustment of the building plane can be performed by changing the relative position between the coating unit and the building platform, in particular by moving the building platform or the coating unit in a vertical direction.

According to one embodiment, the at least two segments and/or their sub-segments form a closed path, in particular a circular path, along the building plane, in particular so that the coating unit can pass directly, or indirectly via at least one further segment or its sub-segments, from the first segment into the second segment and from the second segment into the first segment.

The segments or sub-segments are provided in such a way that a continuous, uninterrupted surface is available by means of the irradiation units and the coating unit for the production or manufacture of at least one three-dimensional object. The crossover between, in particular, adjacently arranged segments or sub-segments can thus take place directly.

For example, when three segments are formed, direct crossovers can take place between the first and second segments, the second and third segments, and the third and first segments. An indirect crossing would be possible, for example, between the first and third segments, with the second segment in between.

By preferably forming the building platform in an annular shape, the irradiation units and the coating unit can be used to fabricate or manufacture multiple or a single three-dimensional object in a circular fashion or over an angular range of 360 degrees.

According to a further embodiment, the system is adapted to provide a relative movement for changing the vertical relative position between the building platform and the coating unit within the building space continuously or discontinuously.

The readjustment or new adjustment of the building plane may be performed or commenced during the application or after the completion of the application of a previous or preceding layer of build-up material, in particular a complete layer of build-up material along all segments or sub-segments. Thus, the readjustment or new adjustment of the building plane can also already be carried out if at least one of the segments or sub-segments has not yet been selectively solidified.

In both the discontinuous and the continuous readjustment of the building plane by a relative movement between the building platform and the coating unit, deviations during the selective solidification of build-up material can be disregarded or can be compensatable by an adaptation of the irradiation units, in particular by a change of angle.

In terms of a continuous movement of the coating unit, the coating unit continues to move in the extension direction of the building platform during the readjustment of the building plane, i.e. during the vertical relative movement between the coating unit and the building platform. During the application of build-up material along a building plane, the readjustment for the following building plane can already be carried out or started. Furthermore, the relative movement or readjustment of the building plane can also be started or continued during an idle run of the coating unit.

Alternatively, the movement of the coating unit can be temporarily interrupted for the duration of the relative movement between the building platform and the coating unit, in particular in the sense of a discontinuous movement of the coating unit.

According to one embodiment, a checking and adaptation as required, of the position and/or the orientation of at least one of the irradiation units can be carried out after each selectively solidified layer of build-up material or after any number of selectively solidified layers of build-up material, in order to minimise, as required, the total irradiation time of one layer or several layers of build-up material.

Preferably, an adaptation of the irradiation area of at least one of the irradiation units can be performed after or for a plurality of layers of build-up material, e.g. for five consecutive layers of build-up material. In this respect, the adaptation of the irradiation area of at least one irradiation unit can be performed in such a way that a time-efficient selective solidification of the plurality of consecutive layers of build-up material is achievable.

According to a further embodiment, segments along partially overlapping irradiation areas of the at least two irradiation units can be selectively solidified by one or both irradiation units for minimising as required the total irradiation time of one layer or several layers of build-up material.

The deposited layer of build-up material may be solidifiable along the overlapping irradiation areas by one of the two irradiation units. Alternatively, the deposited layer of build-up material may be selectively solidifiable along the overlapping irradiation areas each partially by of one of the two irradiation units. In particular, depending on the complexity of the structure of the layer of build-up material to be selectively solidified along the irradiation areas, a time-efficient or time-optimised selective solidification can be performed by means of the adaptable irradiation units.

In one embodiment, the position and/or the orientation of individual irradiation units can be adapted automatically and/or manually.

Both a manual operation or adjustment of the irradiation areas by a user of the system as well as fully automatic control of the system, in particular for adjusting the irradiation areas of the irradiation units, are conceivable.

According to a preferred embodiment, the system comprises a control unit which is preferably designed at least for adjusting the irradiation areas and/or for irradiating overlapping irradiation areas along the segments in the building plane by at least two irradiation units, in that the position and/or the orientation of the irradiation units for selective solidification of the applied layer of build-up material in the building plane of the at least one three-dimensional object to be produced can be changed, in particular between the beginning and the end of the production of the at least one three-dimensional object.

According to a further embodiment, the control unit is further at least adapted to control the movement and/or the duration of a revolution or a revolution duration of the coating unit as well as the application of build-up material by the coating unit, an activation and deactivation of at least one of the irradiation units, preferably several irradiation units, particularly preferably all irradiation units, and/or the execution of the vertical relative movement between the building platform and the coating unit within the building space.

The control unit of the system according to the invention is preferably provided for controlling and/or regulating the system in the meaning of the method according to the invention, at least as required. In this respect, the control unit is in particular designed to execute or perform a process according to the invention with the system.

An efficient and process time-optimised additive manufacturing of at least one three-dimensional object can be provided.

According to a further ancillary aspect of the invention, there is provided a computer-readable storage medium containing instructions which cause at least one processor, in particular a processor of the control unit of a system according to the invention, to implement a method according to the invention when the instructions are executed by the at least one processor.

BRIEF DESCRIPTION OF THE DRAWINGS

The invention will be explained in more detail below, with further reference to the accompanying schematic drawings, with reference to exemplary embodiments.

In these show.

DETAILED DESCRIPTION OF THE EMBODIMENTS

Figure 1:
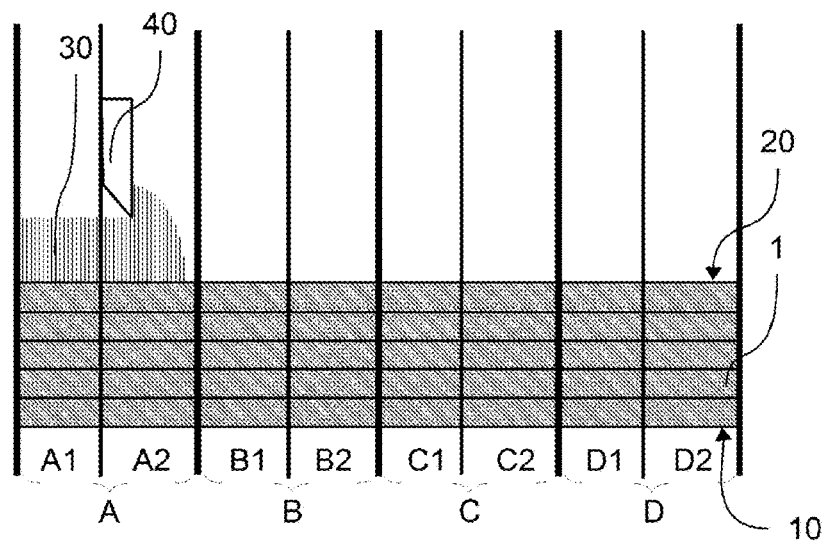
FIGS. 1-3 schematic representations of various states during an exemplary sequence of the method according to the invention by means of a system according to the invention.

FIG. 1 shows a schematic cross-sectional view of a building platform 10, which is divided into a total of four segments A; B; C; D. According to FIG. 1, there are five selectively solidified layers on the building platform for forming at least one three-dimensional object 1.

The building plane 20 provided according to FIG. 1 is set on the uppermost, selectively solidified layer of building material 30 of the object 1 to be manufactured. Along the building plane 20, a coating unit 40 deposits a layer of build-up material 30 over the extension of the first segment A according to FIG. 1.

Figure 2:
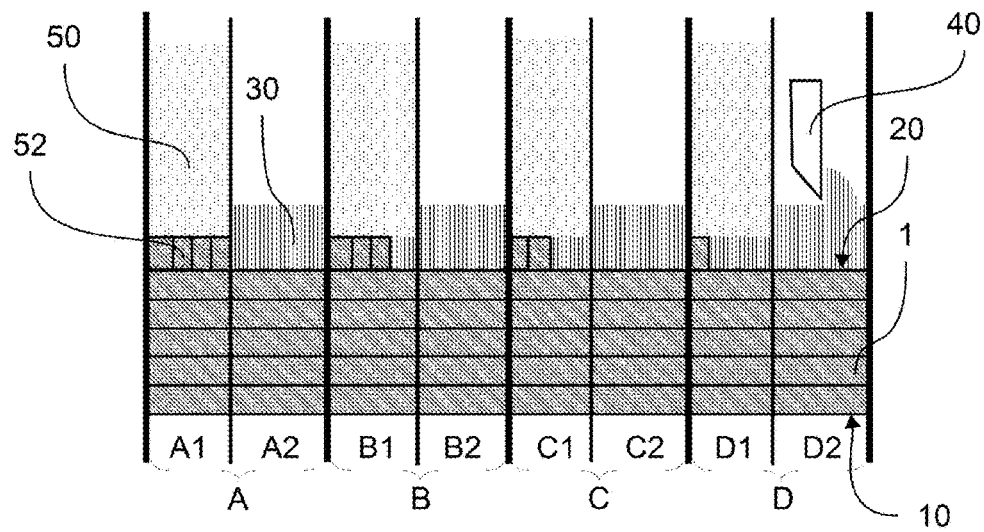
Figure 3:
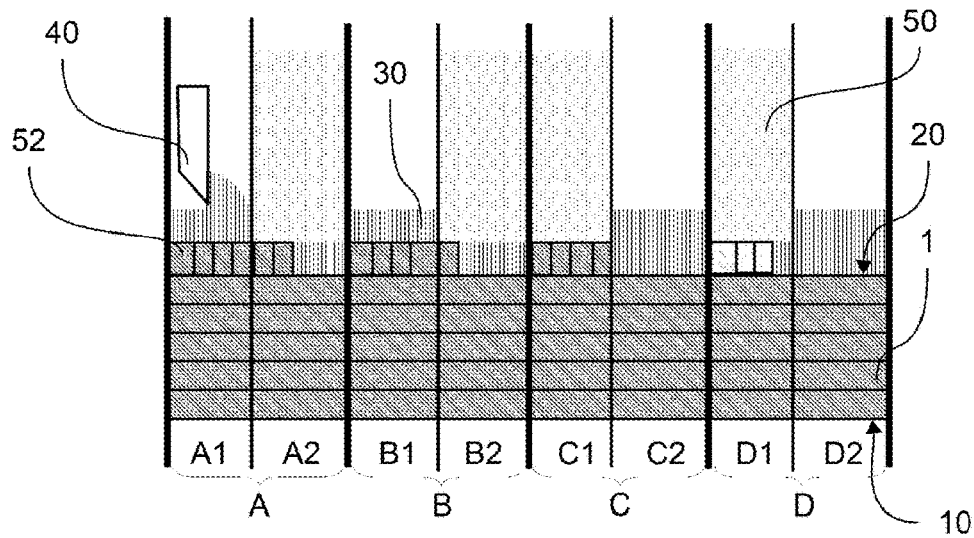

For the purposes of FIGS. 1-3, a movement of the coating unit 40 is to be understood as a movement from left to right through the segments A to D along the building platform 10. Preferably, the segments A; B; C; D have comparable, in particular identical, irradiation times as required for selective solidification of applied build-up material 30.

A preferably annular configuration of the building platform 10 is illustrated in FIGS. 1 to 3 in that the coating unit 40 crosses over directly from the fourth segment D into the first segment A, to perform a circular movement or revolution.

In FIG. 1, it is further shown that the segments A; B; C; D are each further divided into two sub-segments A1; A2; B1; B2; C1; C2; D1; D2. The coating unit 40 may apply a layer of build-up material 30 along the sub-segments A1; A2; B1; B2; C1; C2; D1; D2 to deposit a complete layer of build-up material 30.

In this sense, the sub-segments A1-D2 of segments A-D may be provided with comparable, in particular identical, irradiation times as required for selectively solidifying applied build-up material 30.

In FIG. 2, the selective solidification of the build-up material 30 has been initiated in the first sub-segments A1; B1; C1; D1 of the segments A; B; C; D by means of the respectively associated irradiation unit 50, in particular in each case immediately after the coating unit 40 has been moved out of the respective sub-segment A1; B1; C1; D1.

In particular, the sub-segments A1; A2; B1; B2; C1; C2; D1; D2 of a respective segment A; B; C; D are associated with a common irradiation unit 50 which can selectively solidify the sub-segments A1; A2; B1; B2; C1; C2; D1; D2 of a segment A; B; C; D serially or alternately. Thus, in FIG. 2, it is shown that after a complete layer of build-up material 30 has been applied, in each case the first sub-segment A1; B1; C1; D1 of segments A; B; C; D is selectively solidified.

Respective progress indicators 52 indicate the progress of the selective solidification. Thus, it is shown that, according to FIG. 2, the selective solidification of the first sub-segment A1 of the first segment A is completed until the coating unit 40 re-enters. Subsequently, the second sub-segment A2 of the first segment A is selectively solidified by means of the associated irradiation unit 50.

After the first sub-segments A1; B1; C1; D1 are selectively solidified, the individual irradiation units 50 may each proceed with selective solidification of the second sub-segment A2; B2; C2; D2.

Thus, the coating unit 40 may enter the selectively solidified first sub-segment A1 of the first segment A, which according to FIG. 3 may be provided as a parking segment.

In FIG. 3, the irradiation time as required of the first sub-segment A1 of the first segment A has expired and the last applied build-up material 30 is thus selectively solidified. Subsequently to the first sub-segment A1, in FIG. 3 the second sub-segment A2 of the first segment A is selectively solidified with the same, associated irradiation unit 50 until the expiry of the respective irradiation time as required. The same applies to the first and second sub-segments B1; B2 of the second segment B. In this sense, there is a serial selective solidification of the sub-segments A1-D2 of the respective segments A-D.

In FIGS. 4a to 4d, the arrangement and adaptation of the irradiation areas of the irradiation units 50 associated with the first segment A and the second segment B are shown schematically. Here, the first and second segments A; B are shown as individual segments.

Figure 4A:
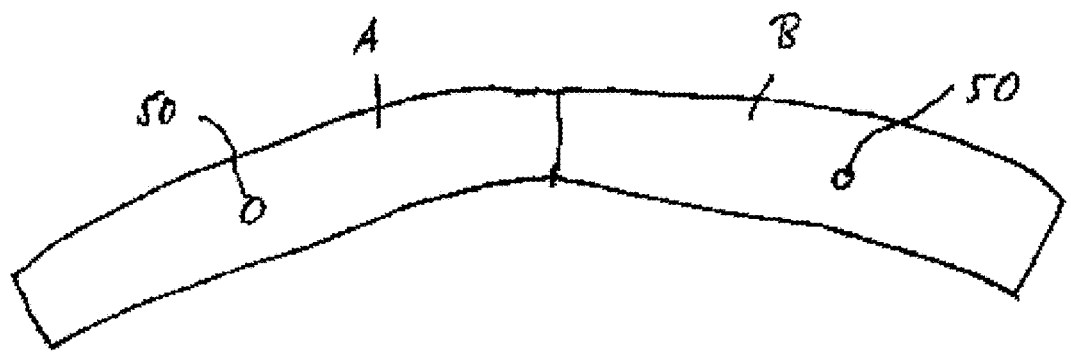
FIG. 4a-4d schematic illustration of an adaptation of irradiation areas of several irradiation units.

In FIG. 4a, the irradiation units 50 are positioned substantially centrally opposite the respective segments A; B. Furthermore, according to FIG. 4a, segments A; B are of equal size to ensure a comparable total irradiation time for selective solidification by the respectively associated irradiation unit 50.

Figure 4B:
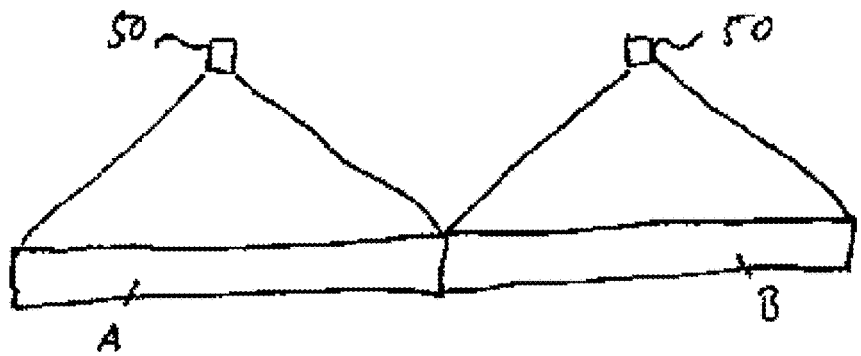

FIG. 4b shows how the irradiation units 50 of the first and second segments A; B form adjacent irradiation areas. In particular, the irradiation areas according to FIG. 4b are adjacent to each other along the boundary between the first and second segments A; B. Thus, the first segment A and the second segment B can be selectively solidified by the respective associated irradiation unit 50 alone.

Figure 4C:
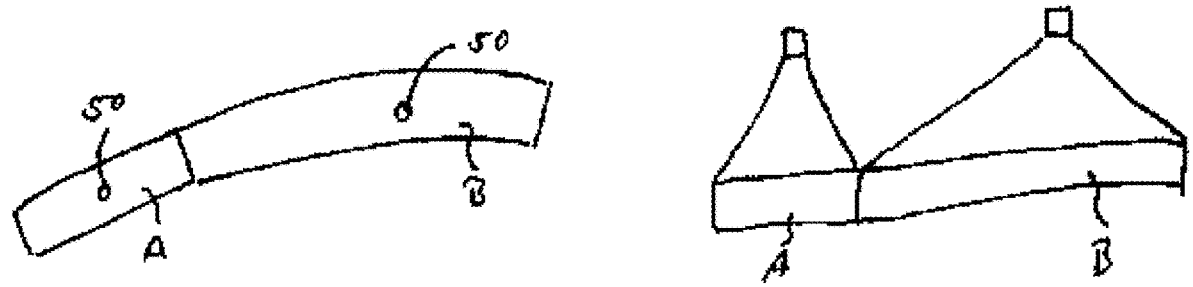

Adjacent irradiation areas of adjacent segments A; B are also shown in FIG. 4c. The segments A; B are formed with different sizes to ensure comparable total irradiation times for selective solidification of applied build-up material 30. For this purpose, the irradiation units 50 can be moved or be displaceable in the direction of extension of the building platform 10. Furthermore, an irradiation unit 50 according to FIG. 4c, in this case of the second segment B, can also be arranged off-centre of the respective assigned segment A; B; C; D.

Figure 4D:
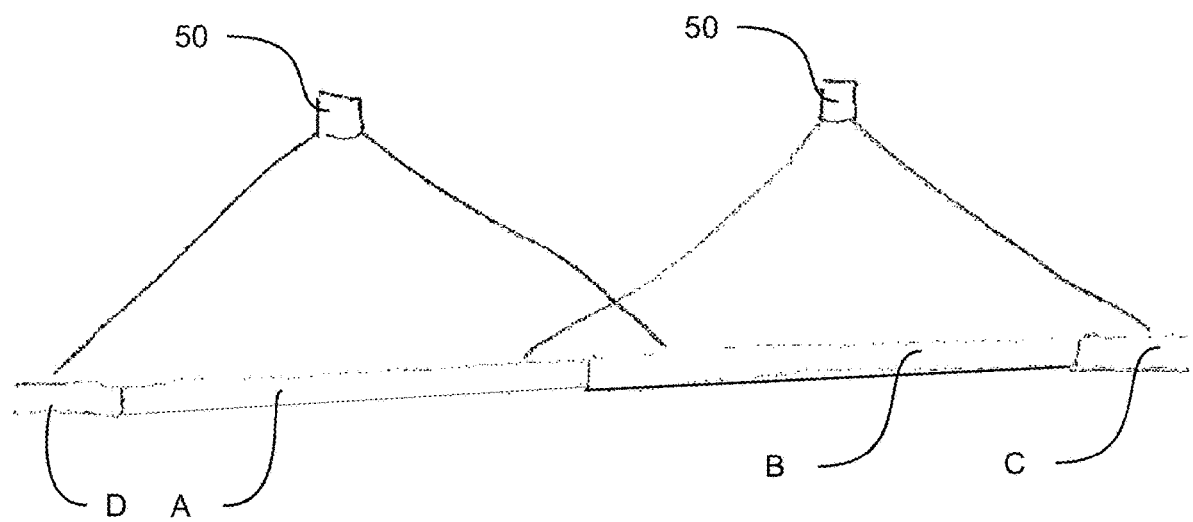

FIG. 4d shows the case of overlapping irradiation areas of the irradiation units 50 of the first and second segments A; B. The irradiation units 50 associated with the first and second segments A; B project with their irradiation areas respectively into the adjacent segments A; B; C; D and can thus be used in sections for selective solidification in these adjacent segments A; B; C; D. In particular, the irradiation unit 50 of the first segment A can at least partially selectively solidify the adjacent segments B; D along the overlapping irradiation areas. Similarly, the irradiation unit 50 associated with the second segment B can selectively solidify the adjacent segments C; A at least in sections along the overlapping irradiation areas.

In particular, the irradiation units 50 can each have an irradiation area that projects beyond the respective, associated segment A; B. Alternatively, the alignment of the irradiation units or their beam path can be adaptable in such a way that the respective irradiation unit 50 can radiate into the adjacent segment A; B; C; D.

The overlapping areas of the irradiation units 50 shown in FIG. 4d can be selectively solidifiable by one of the irradiation units 50 or can be solidified in sections by one of the two irradiation units 50. Thus, efficient selective solidification of the last applied layer of build-up material 30 is possible.

Figure 5:
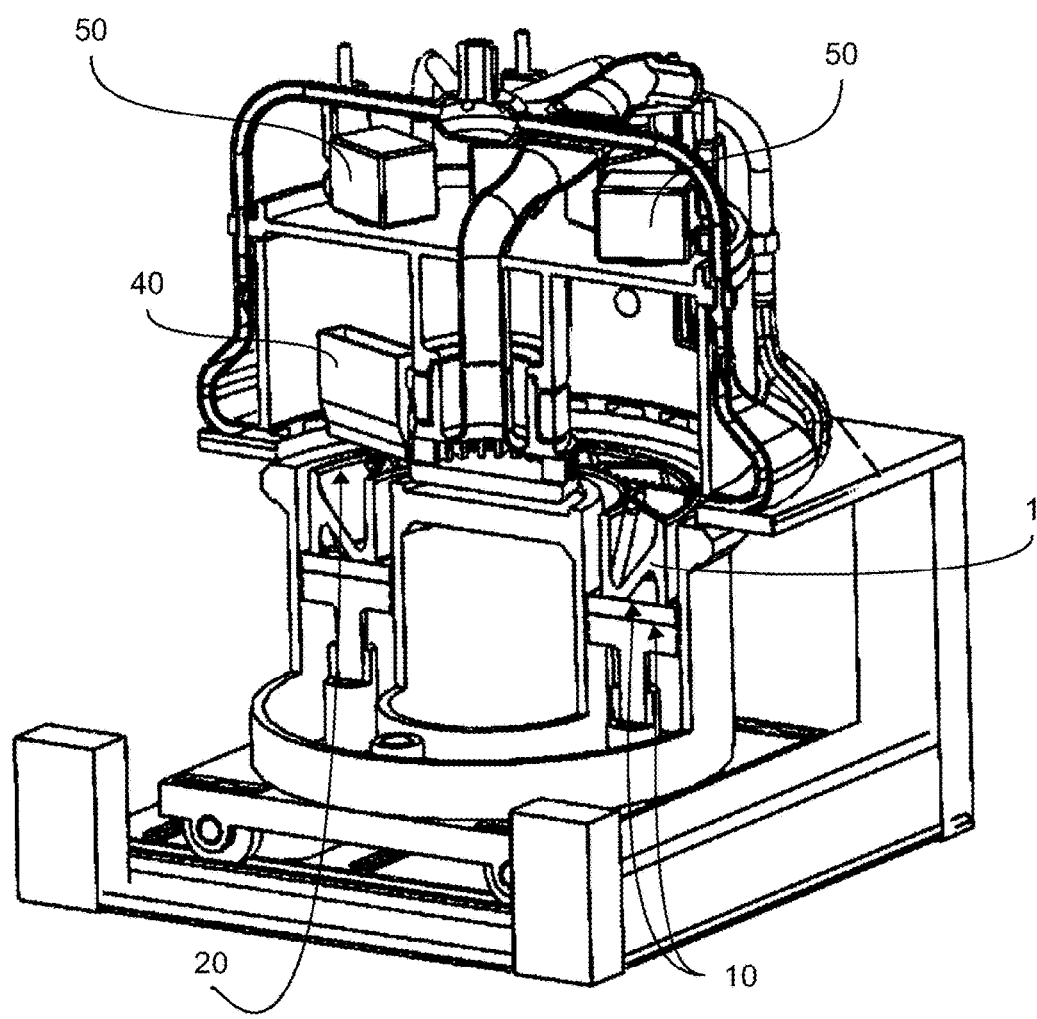
FIG. 5 an embodiment of a system according to the invention for additive manufacturing of at least one three-dimensional object in a perspective sectional view.

In FIG. 5, an exemplary embodiment of a system according to the invention for additive manufacturing of at least one three-dimensional object 1 is shown in a perspective cross-section.

The system has the building platform 10, above which a building space is formed for the layer-by-layer building of at least one three-dimensional object 1. In particular, one three-dimensional object 1 or several three-dimensional objects 1 distributed along the annular or circular extension of the building platform 10 can be built up layer by layer.

The coating unit 40 is arranged above and vertically spaced apart from the building platform 10 and can apply or deposit build-up material 30 along the respective set building plane 20 in the sense of a layer-by-layer build.

Irradiation units 50 are arranged above and vertically spaced from the coating unit 40 and distributed over the extension of the annular building platform 10. In particular, the irradiation units 50 are respectively associated and arranged with the segments A; B; C; D for selective solidification.

In summary, a time-optimised, efficient manufacture of at least one three-dimensional object 1 can be made possible by means of the targeted use or the targeted adaptation of the irradiation units 50, the irradiation areas of which can be adapted as required and can be provided overlapping or adjoining one another.

In this sense, the non-productive times for additive manufacturing can be reduced, the efficiency of the system utilisation in the production of three-dimensional objects 1, in particular also of a single large, three-dimensional object 1, can be optimised and a sufficient quality of the resulting three-dimensional object 1 can be ensured.

LIST OF REFERENCE SIGNS

1 object to be produced/processed layers of building material
10 building platform
20 building plane
30 layer of build-up material to be applied
40 coating unit
50 activated irradiation unit
52 progress indicators
A; B; C; D segments
A1; A2 sub-segments of the first segment
B1; B2 sub-segments of the second segment
C1; C2 sub-segments of the third segment
D1; D2 sub-segments of the fourth segment

The invention claimed is:

1. A method for the additive manufacturing of an object by a system including a building space, a building platform within the building space and on which the object to be manufactured can be built up layer by layer, a coating unit for the layer by layer application of a build-up material in a building plane that is parallel to the building platform, and a plurality of irradiation units for a locally selective solidification of the build-up material in the building plane, wherein the method comprises:

subdividing the building space into at least a first and a second segment along a direction of extension of the building platform, wherein at least one of the segments is subdivided into at least two sub-segments;

assigning the plurality of irradiation units to at least one of the first segment of the second segment or to at least one of the sub-segments, wherein the irradiation units are arranged adjacent to one another, partially overlap or respective irradiation areas adjoin one another;

adapting the irradiation areas along the building plane by adapting a position or an orientation of at least one of the irradiation units, so that a total irradiation time for selectively solidifying the build-up material is minimized, wherein at least one of the plurality of irradiation units can switch during selective solidification between two sub-segments as required, and wherein an irradiation area of a first irradiation unit and an irradiation area of a second irradiation unit at least partially overlap in an overlapping irradiation area, and wherein the first and second irradiation units are adapted to solidify build-up material within the overlapping irradiation area in such a way that a reduced irradiation time is achieved over a plurality of layers of the build-up material; and applying and selectively solidifying a layer of the build-up material along the segments or the sub-segments.

2. The method according to claim 1, further comprising changing a relative position between the building platform and the coating unit to provide a changed building plane.

3. The method according to claim 1, further comprising checking and adapting the position or the orientation of the at least one of the irradiation units after each selectively solidified layer of the build-up material or after any number of selectively solidified layers of the build-up material, in order to minimize the total irradiation time of one layer or several layers of the build-up material.

4. The method according to claim 1, wherein the position or the orientation of the irradiation units is adapted automatically or manually.

5. The method according to claim 1, wherein the reduced irradiation time is achieved over the plurality of layers of the build-up material by adapting the first irradiation unit and the second irradiation unit to spend an equal amount of time solidifying the build-up material in the overlapping irradiation area.

* * * * *